(12) United States Patent
Volokh

(10) Patent No.: US 7,909,545 B2
(45) Date of Patent: Mar. 22, 2011

(54) BALLNOSE END MILL

(75) Inventor: Vladimir Volokh, Maalot (IL)

(73) Assignee: Hanita Metal Works, Ltd., Shlomi (IL)

( * ) Notice: Subject to any disclaimer, the term of this patent is extended or adjusted under 35 U.S.C. 154(b) by 434 days.

(21) Appl. No.: 11/954,185

(22) Filed: Dec. 11, 2007

(65) Prior Publication Data

US 2008/0152438 A1 Jun. 26, 2008

Related U.S. Application Data

(63) Continuation of application No. 11/022,823, filed on Dec. 28, 2004, now abandoned.

(30) Foreign Application Priority Data

Dec. 19, 2003 (IL) .......................................... 159639

(51) Int. Cl.
*B23C 5/10* (2006.01)
(52) U.S. Cl. ............................. 407/54; 407/53; 407/61
(58) Field of Classification Search .................. 407/53, 407/54, 34, 48; 408/211, 230, 227
See application file for complete search history.

(56) References Cited

U.S. PATENT DOCUMENTS

| | | | | |
|---|---|---|---|---|
| 4,143,723 A | * | 3/1979 | Schmotzer | 175/420.1 |
| 4,373,839 A | * | 2/1983 | Negishi et al. | 408/59 |
| 4,565,471 A | * | 1/1986 | Negishi et al. | 408/204 |
| 4,566,827 A | * | 1/1986 | Neumueller | 407/42 |
| 4,934,881 A | | 6/1990 | Tsujimura et al. | |
| 4,984,943 A | * | 1/1991 | Hamilton | 408/144 |
| 5,188,487 A | | 2/1993 | Okawa et al. | |
| 5,221,162 A | | 6/1993 | Okawa | |
| 5,294,219 A | | 3/1994 | Shiratori et al. | |
| 6,231,275 B1 | | 5/2001 | Kunimori et al. | |
| 6,238,151 B1 | * | 5/2001 | Takagi | 408/230 |
| 6,652,201 B2 | | 11/2003 | Kunimori et al. | |

FOREIGN PATENT DOCUMENTS

| | | |
|---|---|---|
| DE | 115 148 | 9/1901 |
| DE | 89 01 319 | 4/1989 |
| EP | 0 818 263 | 1/1998 |
| JP | 56114609 | 9/1981 |
| JP | 61 168415 | 7/1986 |
| JP | 62 203709 | 9/1987 |
| JP | 9 262714 | 10/1997 |
| JP | 10249623 A * | 9/1998 |
| JP | 2000 117522 | 4/2000 |

(Continued)

OTHER PUBLICATIONS

Partial European Search Report 04 03 0794.

*Primary Examiner* — Boyer D Ashley
*Assistant Examiner* — Sara Addisu
(74) *Attorney, Agent, or Firm* — Larry R. Meenan

(57) ABSTRACT

A machining tool, such as a ballnose end mill, a flat end mill, or a drill, which has a center area that is designed for improved ejection of chips produced during cutting of a workpiece. The machining tool has an edge on the end or tip of the tool starting proximate to the central rotational axis of the tool at a position located a distance above the x axis and to the right of the y axis.

7 Claims, 6 Drawing Sheets

FOREIGN PATENT DOCUMENTS

| | | |
|---|---|---|
| JP | 2001 009 524 | 1/2001 |
| JP | 2001 009624 | 1/2001 |
| JP | 2001 047 671 | 2/2001 |
| JP | 2001 293609 | 10/2001 |
| JP | 2001 334 405 | 12/2001 |
| JP | 2001 341 026 | 12/2001 |
| JP | 2003 053 617 | 2/2003 |

* cited by examiner

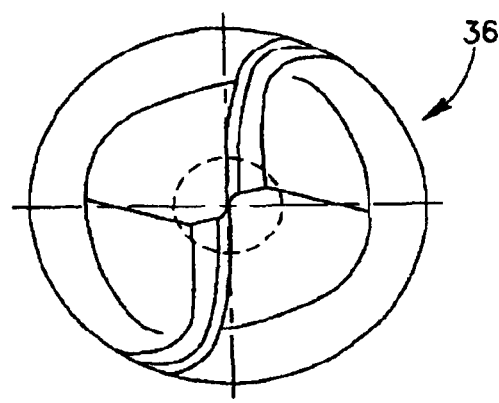
FIG. 5
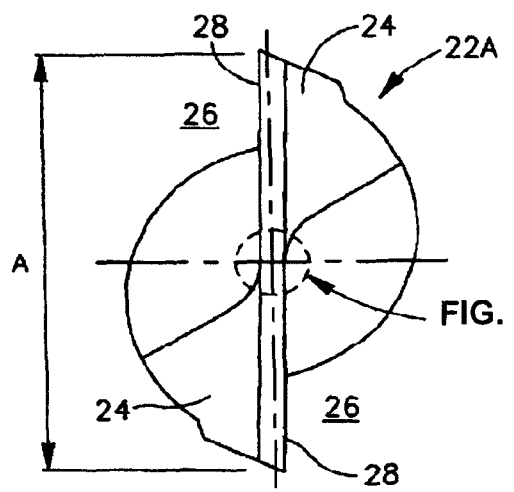 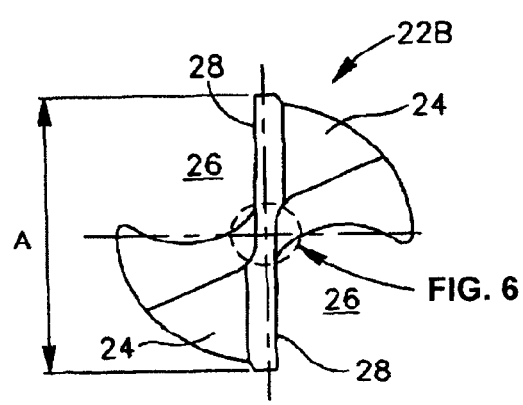
FIG. 5A      FIG. 5B

BALLNOSE END MILL

FIELD AND BACKGROUND OF THE INVENTION

The present invention relates to tools for the machining of materials by milling or drilling. More particularly, the invention provides an improved form for an end mill having a semi-spherical cutting end, or flat cutting end, or drill end, the center area of which is configured to better eject chips and thus to improve the surface finish of the metal work piece and tool life.

End mills and drills are widely used in milling and drilling operations due to their versatile range of application and due to the moderate first cost of the tool. End mills and drills are often of cylindrical shape, and are available up to about 80 mm diameter. End mills having a semispherical cutting end (referred to as ball end or ballnose) are widely used, being particularly useful for CNC work producing complex shapes. End mills with flat cutting end are widely used in ramping, planing, orbital drilling, and drilling applications. Drills are widely used in different drilling applications on milling and turning machines. An end mill typically has 2 to 10 teeth, depending on diameter size and whether the end mill is intended for rough cutting or finishing. End mills with a flat cutting end used in ramping, planing, orbital drilling, and drilling applications typically have 2 to 6 teeth. Drills used in different drilling applications on milling and turning machines typically have 2 to 4 teeth. Teeth are usually of spiral (helical) shape, but can be straight parallel to the axis. Some materials used in the construction of such mills and drills include high speed steel, solid carbide, cermet or ceramic, or combinations thereof.

An important problem which has attracted much attention is the clearing away of the chips produced during machining. Milled and drilling chips are never continuous, and, if not removed, may again be drawn into the cutting area between one of the cutting teeth and the work piece. Similarly, the clearing away of the chips produced during machining is very important in drilling applications. The result of the not clearing away of the chips produced during machining is a degraded surface finish marred by small grooves or scratches, vibration during machining, short tool life and poor dimensional accuracy. While much can be achieved by improved coolant flow and by air blasts, an important further factor in effecting improvement is the shape of the cutting teeth.

Many different cutter forms are seen in the prior art. Among relevant patents are the following: Japanese application 2001047671 of Takeshi, Japanese patents JP2001334405 and JP2001009524 to Masami, JP2003053617 to Takeshi, JP2001341026 to Ryosuke, U.S. Pat. No. 4,934,881 to Tsujimura et al., U.S. Pat. No. 5,188,487 to Okawa et al., U.S. Pat. No. 5,221,162 to Okawa, U.S. Pat. No. 5,294,219 to Shiratori et al., and U.S. Pat. Nos. 6,231,275 B1 and 6,652,201 B2 to Kunimori et al.

Cutters made according to the Japanese patents JP2001334405 and JP2001341026 have been found to provide inadequate chip clearance causing chip reentry and also insufficient access for coolant to the center of the end mill.

Unfortunately, without carefully controlled test machining, there is no way of knowing how effective the prior art end mill forms are merely from the description of the tooth geometry provided. Furthermore, the tooth designs disclosed in the above documents may be optimized for maximum metal removal, or for maximum tool wear life or for resistance to breakage, or for hard or for soft materials, and the tooth form will vary greatly as a function of the different design parameters, and of the cutter diameter.

Extensive experience with various prior-art cutters has however indicated the continued existence of surface flaws in work pieces machined by prior art ballnose end mills, and the root of the problem has been traced to chips which were not dispersed by the coolant. These chips reentered the cutting area and, in the course of machining, lodged momentarily between the end mill and the work piece.

OBJECTS OF THE INVENTION

It is therefore one of the objects of the present invention to obviate the disadvantages of prior art ballnose end mills and drills and to provide a design which improves dispersal of chips out of the cutting area without diminishing other properties of the end mill or drill.

It is a further object of the present invention to thereby improve surface finish of the work piece, thereby reducing tool vibration and extending tool life.

SUMMARY OF THE INVENTION

The present invention achieves the above objects by providing a tool, such as a ballnose end mill, an end mill with a flat cutting end used in ramping, planing, orbital drilling, and drilling applications, and a drill, having a diameter configured for improved chip removal. The tool comprises a body portion to be gripped by a machine tool and a plurality of flutes machined to form a cutting tooth adjacent to said flute. Each tooth has a cutting end which, depending on the type of tool, is semispherical, or flat, or a drill point. When viewing the cutting end endwise, there can be seen a secondary or minor cutting edge starting proximate to the tool center at a position that is a distance B above the x-axis and 0.5A to the right of the y-axis, which secondary cutting edge extends at an angle $\alpha$ relative to the y-axis for a length C. The value of A is the distance of the total off-set between the primary or major cutting edges of two teeth disposed at 180° to each other, and, for the machining of different materials, the value of A is 0.003D to 0.030D, where D is the diameter of the tool. Both B and C have lengths of between 0.3A to 1.5A, and the angle $\alpha$ has a value of between 5°-45°.

PREFERRED EMBODIMENT OF THE INVENTION

In a preferred embodiment of the present invention there is provided a ballnose end mill, or flat end mill, or drill, wherein the secondary cutting edge is curved and has a radius of curvature R. The locus of the radius of curvature R is located to the right side of the secondary cutting edge when viewing the upper tooth of the ballnose end, flat end, or drill end. The value of R is 0.5A-5A.

The present inventors have prepared a 16 mm diameter two-flute ballnose end mill which was optimized for use on hard materials, coated TiAlN. The end mill was manufactured according to the present specification and produced a smooth surface free from the characteristic flaws resulting from faulty chip clearing.

Cutting conditions: Material Steel D2 hardened to 60-62 HRc,
Cutting speed—150 m/min, cutting feed—0.08 mm/teeth,
Axial depth of cut—0.3 mm,
Radial depth of cut—0.3 mm, dry cutting.

Test results: tool life 200 m in material, surface finish 8-12 micro inch.

SHORT DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the drawings:

FIG. 5 is an end view of a further embodiment of the ballnose end mill according to the present invention;

FIG. 5A is an end view of a flat end mill according to the present invention;

FIG. 5B is an end view of a drill according to the present invention; and

FULL DESCRIPTION OF THE INVENTION

Figure 1:
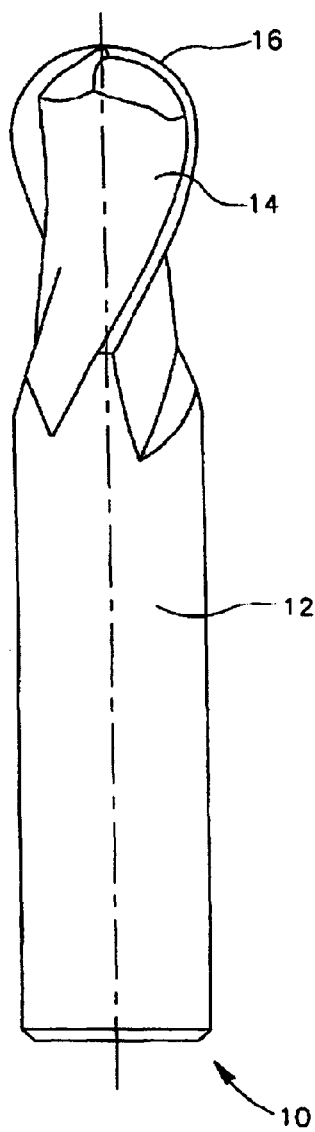
FIG. 1 is an elevational view of a prior-art ballnose end mill.
Figure 1A:
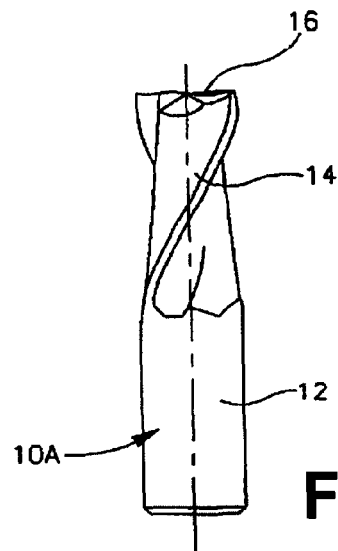
FIG. 1A is an elevational view of a prior-art flat end mill.
Figure 1B:
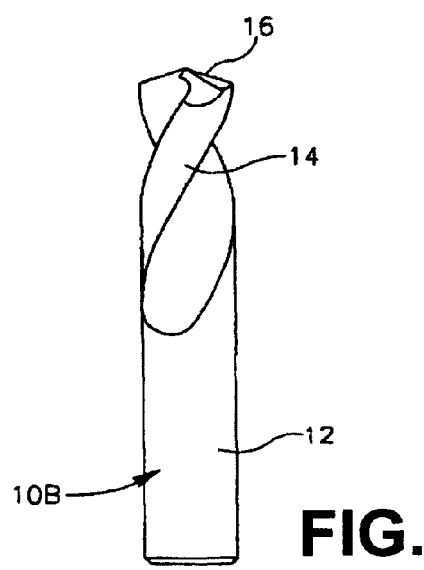
FIG. 1B is an elevational view of a prior-art drill.
Figure 2:
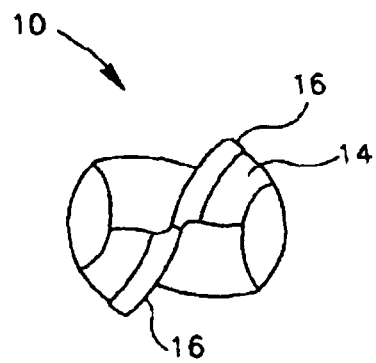
FIG. 2 is an end view of the prior art ballnose end mill seen in FIG. 1.
Figure 2A:
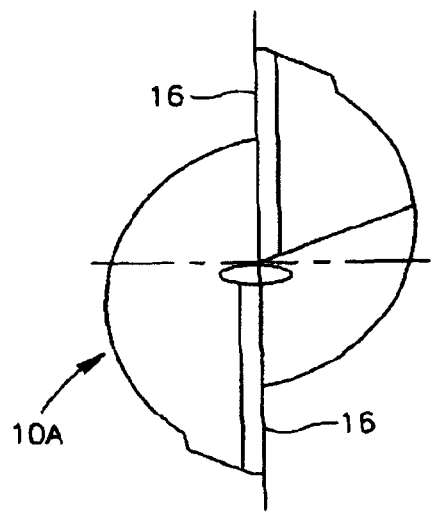
FIG. 2A is an end view of the prior art flat end mill-seen in FIG. 1A.
Figure 2B:
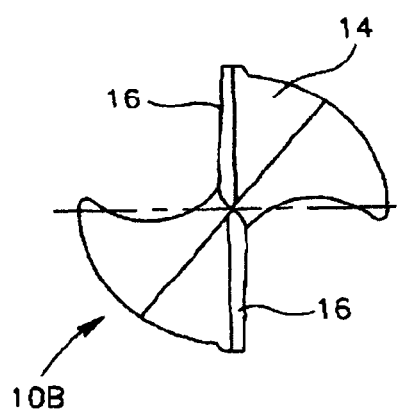
FIG. 2B is an end view of the prior art drill seen in FIG. 1B.
Figure 3:
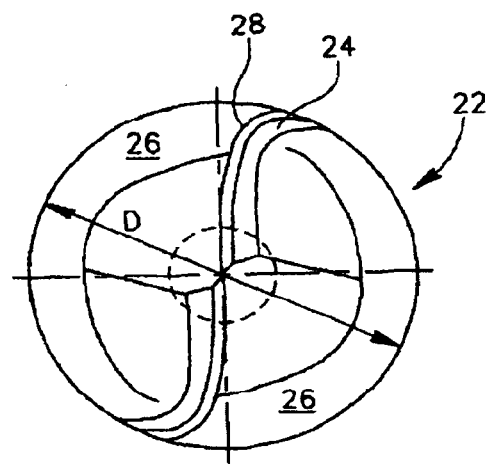
FIG. 3 is an end view of a ballnose end mill according to the present invention.
Figure 3A:
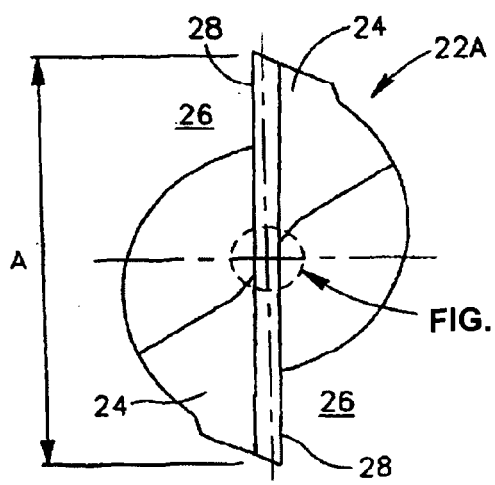
FIG. 3A is an end view of a flat end mill according to the present invention.
Figure 3B:
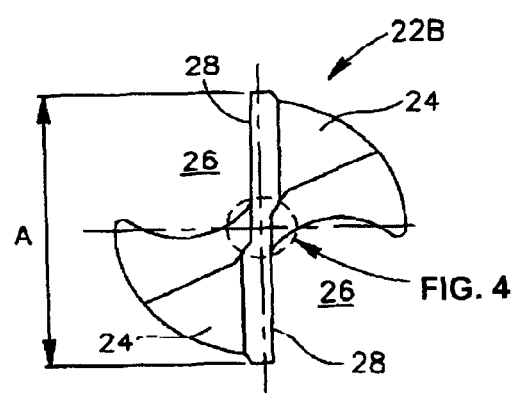
FIG. 3B is an end view of a drill according to the present invention.

There is seen in FIGS. 1 to 3 a prior-art two-flute helical ballnose end mill 10, which corresponds to Japanese patents nos. JP2001334405 and JP2001341026. In FIGS. 1A and 2A there is seen a prior art two-flute helical flat end mill while FIGS. 1B and 2B illustrate a prior art two-flute helical drill. The tools 10, 10a and 10b have a shank portion 12 and tooth flanks 14 capped by a cutting edge 16. The cutting edge 16 of the cutter in FIGS. 2, 2A and 2B carries around the hemispherical end.

Referring now to FIGS. 3, 3A, 3B and 4, there is seen a ballnose end mill 22, a flat end mill 22a and a drill 22b of diameter D according to the present invention. Each of the ballnose end mill 22, the flat end mill 22a and the drill 22b is configured for improved chip removal and comprises a body portion 12, seen in FIGS. 1, 1A, and 1B, which is to be gripped by a machine tool, and two flutes 26 machined to form a cutting tooth 24 adjacent to the flute 26. Each tooth 24 is provided with a primary cutting edge 28, which continue with a side-to-side changeover at cutting edge end sections about the center.

Viewing the ballnose end mill 22, the flat end mill 22a and the drill 22b endwise, there can be seen a tooth-end or secondary cutting edge 32 starting proximate to the cutter center 34 at a position a distance B above the x-axis and a distance 0.5A to the right of the y-axis. The tooth-end or secondary cutting edge 32 extends at an angle α relative to the y-axis for a length C. As can be clearly seen in FIG. 4, the x-axis and the y-axis are perpendicular to one another and intersect at the cutter center 34. The y-axis extends between and essentially parallel to the cutting edges 28, as viewed in FIG. 4.

The ballnose end mill shown in FIG. 3 may have the following values for use for the machining of hard materials in accordance with one possible embodiment:

A=the total off-set between cutting edges of two teeth disposed at 180° to each other; and A=0.003 D to 0.030 D.

B=between 0.3A to 1.5A.

C=between 0.3A to 1.5A, but can be different from B.

Angle α=5° to 45°.

In an exemplary embodiment of a ballnose end mill having a 16 mm diameter D for use in machining hard steels, some of the values could be as follows:

A=0.2 mm.

B=0.1 mm.

C=0.25 mm.

Angle α=35°.

Figure 4:
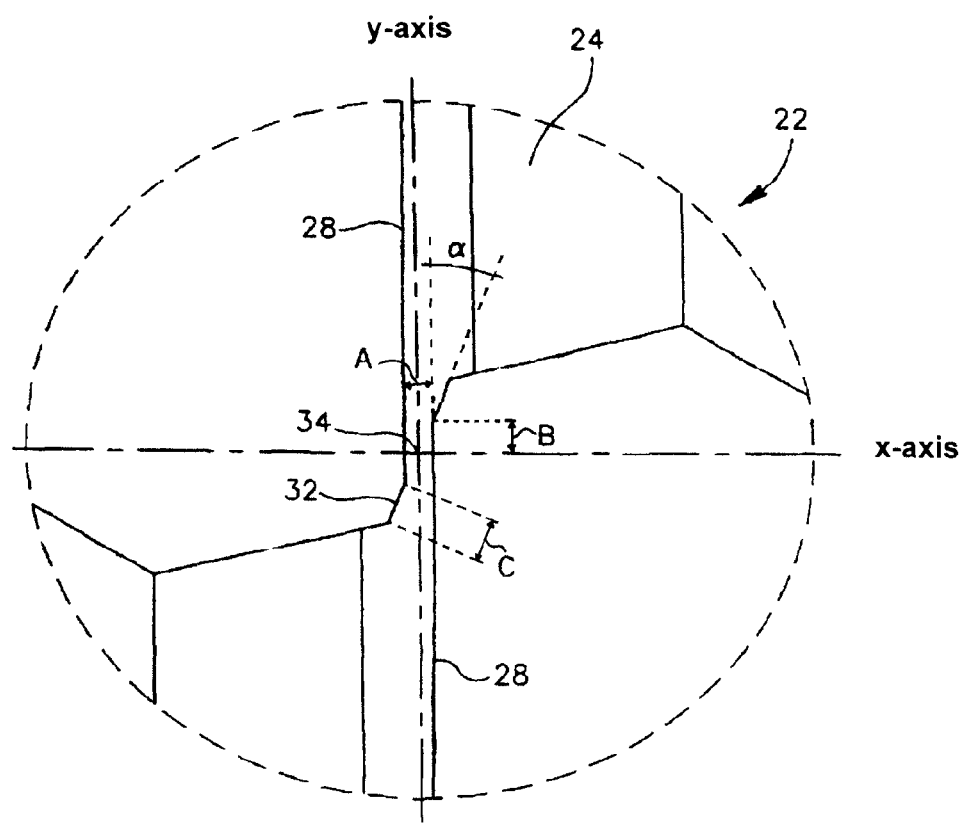
FIG. 4 is an enlarged view of the center portion of FIG. 3, FIG. 3A, and FIG. 3B.
Figure 6:
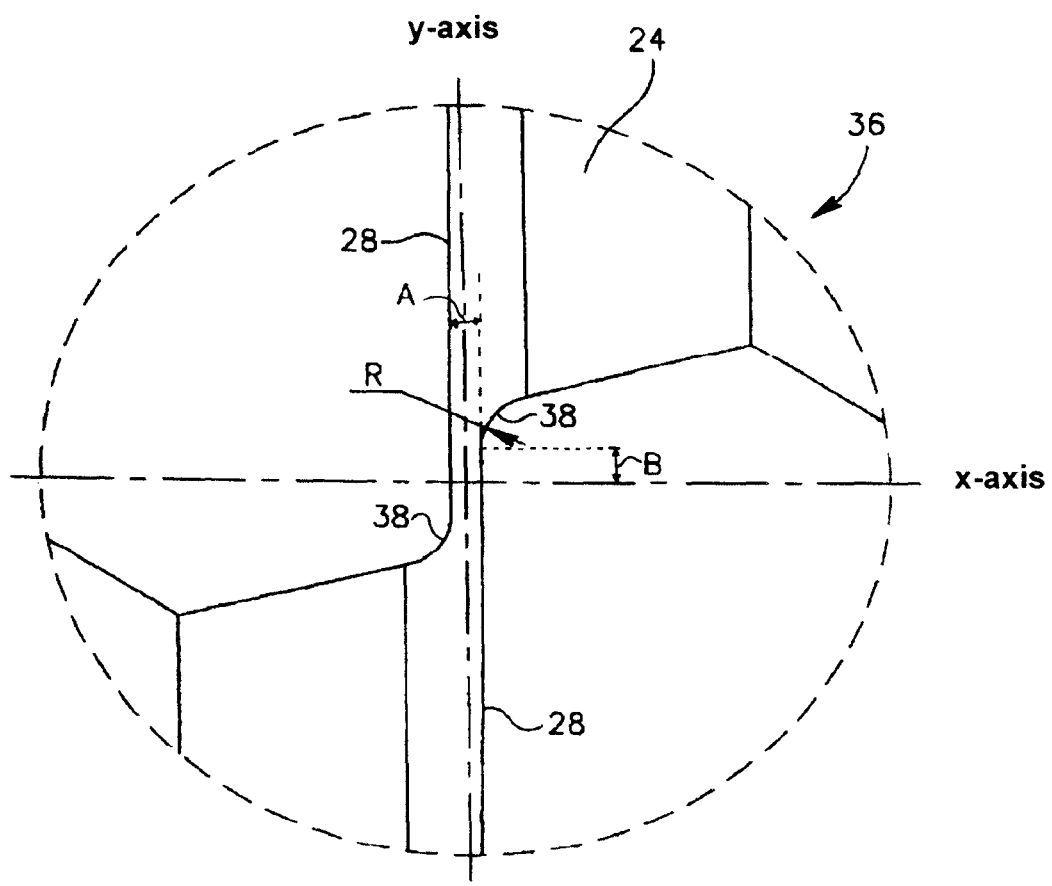
FIG. 6 is an enlarged view of the center portion of FIG. 5, FIG. 5A, and FIG. 5B.

Turning now to FIG. 5, FIG. 5A, FIGS. 5B and 6, there is depicted a further embodiment of a ballnose end mill 36, a flat end mill 36a, and a drill 36b also according to the present invention. A tooth-end or secondary cutting edge 38 is seen starting at a distance B above the x-axis and a distance 0.5A to the right of the y-axis, as seen in FIG. 4. However, the edge 38 is curved at a radius of curvature R. The locus of the radius of curvature R is to the right of the y-axis when viewing the cutting end of the tools. Using the x-y coordinates, the locus is at y=B and x=0.5A+R.

The value of R is 0.5A-5A. Therefore, in the given example where D=16, R=about 0.4 mm.

For both brevity and clarity the examples illustrated have only 2 flutes. The same geometry is however equally applicable to larger tools having 4, 6, 8 or 10 flutes.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

I claim:

1. A ballnose end mill having a diameter and a central rotational axis about which the end mill is to be rotated, said end mill comprising:

a shank portion being configured to be held by a tool;

a fluted portion connected to said shank portion;

said fluted portion comprising a rounded, semispherical tip portion disposed opposite said shank portion; and said fluted portion comprising:

a first chip flute and a corresponding first cutting tooth;

a second chip flute and a corresponding second cutting tooth;

said first cutting tooth comprising a first flank surface;

said second cutting tooth comprising a second flank surface;

said first chip flute being disposed to intersect with said first flank surface to form a first cutting edge;

said second chip flute being disposed to intersect with said second flank surface to form a second cutting edge;

said first cutting edge being disposed to extend along the length of said first chip flute and across a portion of said rounded, semispherical tip portion;

said second cutting edge being disposed to extend along the length of said first chip flute and across a portion of said rounded, semispherical tip portion;

said first flank surface merging with said second flank surface on said rounded, semispherical tip portion to form a continuous flank surface extending continuously along the length of said first cutting tooth, across said rounded, semispherical tip portion, and along the length of said second cutting tooth;

said first cutting edge comprises a first cutting edge end section and said second cutting edge comprises a second cutting edge end section;

said first cutting edge end section is disposed to run on one side of the central rotational axis and said second cutting edge end section is disposed to run on another side of the central rotational axis;

said first cutting edge end section and said second cutting edge end section are each disposed on said tip portion and a distance from the central rotational axis;

said first cutting edge end section is disposed opposite said second cutting edge end section about the central rotational axis and at least substantially parallel to said second cutting edge end section; and said continuous flank surface comprises a smooth, uninterruptedly curved, rounded surface portion disposed between said first cutting edge end section and said second cutting edge end section and which said rounded surface portion passes through the central rotational axis.

2. The ballnose end mill according to claim 1, wherein said tip portion comprises an integral tip portion of the same material throughout.

3. The ballnose end mill according to claim 2, wherein:

said first cutting edge end section is disposed a distance A from said second cutting edge end section as measured along a line substantially perpendicular to each of said cutting edge end sections, wherein said distance A is in the range of 0.003 to 0.030 of the diameter of the ballnose end mill;

said first tooth comprises a first secondary cutting edge connected to and extending from said second cutting edge end section of said second cutting edge;

said first secondary cutting edge has a length in the range of 0.3A to 1.5A;

said second tooth comprises a second secondary cutting edge connected to and extending from said first cutting edge end section of said first cutting edge; and said second secondary cutting edge has a length in the range of 0.3A to 1.5A.

4. The ballnose end mill according to claim 3, wherein:

said first secondary cutting edge is disposed at an angle in the range of 5-45 degrees with respect to a line extending from and parallel to said second cutting edge end section; and said second secondary cutting edge is disposed at an angle in the range of 5-45 degrees with respect to a line extending from and parallel to said first cutting edge end section.

5. The ballnose end mill according to claim 4, wherein:

said end mill has an x-axis which intersects the central longitudinal axis and is substantially perpendicular to each of said end sections, and a y-axis which intersects the central longitudinal axis and is perpendicular to the x-axis;

said first secondary cutting edge and said second cutting edge end section are connected at a point located at a distance of 0.3A to 1.5A from the x-axis as measured on a line extending from and perpendicular to the x-axis, and located at a distance of 0.5A from the y-axis as measured on a line extending from and perpendicular to the y-axis; and said second secondary cutting edge and said first cutting edge end section are connected at a point located at a distance of 0.3A to 1.5A from the x-axis as measured on a line extending from and perpendicular to the x-axis, and located at a distance of 0.5A from the y-axis as measured on a line extending from and perpendicular to the y-axis.

6. The ballnose end mill according to claim 3, wherein:

said end mill has an x-axis which intersects the central longitudinal axis and is substantially perpendicular to each of said end sections, and a y-axis which intersects the central longitudinal axis and is perpendicular to the x-axis;

said first secondary cutting edge has a radius of curvature in the range of 0.5A to 5A;

said first secondary cutting edge extends convexly, outwardly toward the y-axis and concavely, inwardly away from the x-axis;

said second secondary cutting edge has a radius of curvature in the range of 0.5A to 5A; and said second secondary cutting edge extends convexly, outwardly toward the y-axis and concavely, inwardly away from the x-axis.

7. The ballnose end mill according to claim 6, wherein:

said first secondary cutting edge and said second cutting edge end section are connected at a point located at a distance of 0.3A to 1.5A from the x-axis as measured on a line extending from and perpendicular to the x-axis, and located at a distance of 0.5A from the y-axis as measured on a line extending from and perpendicular to the y-axis; and said second secondary cutting edge and said first cutting edge end section are connected at a point located at a distance of 0.3A to 1.5A from the x-axis as measured on a line extending from and perpendicular to the x-axis, and located at a distance of 0.5A from the y-axis as measured on a line extending from and perpendicular to the y-axis.

* * * * *